United States Patent [19]

Bruce

[11] Patent Number: 4,937,937
[45] Date of Patent: Jul. 3, 1990

[54] METHOD FOR THE MANUFACTURE OF PISTON RINGS

[75] Inventor: John R. Bruce, Tilton on the Hill, England

[73] Assignee: T&N Technology Limited, Rugvy, England

[21] Appl. No.: 371,792

[22] Filed: Jun. 27, 1989

[30] Foreign Application Priority Data

Jun. 30, 1988 [GB] United Kingdom ............. 8815604
Sep. 19, 1988 [GB] United Kingdom ............. 8821996

[51] Int. Cl.⁵ .............................................. B23B 5/26
[52] U.S. Cl. ........................... 29/888.073; 29/888.07; 29/412; 72/138
[58] Field of Search ............. 29/156.62, 156.63, 156.6, 29/412; 72/138

[56] References Cited

U.S. PATENT DOCUMENTS

| | | | |
|---|---|---|---|
| 3,778,877 | 12/1973 | Walkar | 29/412 |
| 4,497,102 | 2/1985 | Ikutake | 29/156.6 |
| 4,499,643 | 2/1985 | Ikutake | 29/156.5 R X |
| 4,856,105 | 8/1989 | Brocksieper et al. | 29/156.63 X |

FOREIGN PATENT DOCUMENTS

| | | | |
|---|---|---|---|
| 2838128 | 3/1980 | Fed. Rep. of Germany . | |
| 543466 | 4/1977 | U.S.S.R. | 72/138 |
| 0640798 | 1/1979 | U.S.S.R. | 29/156.62 |
| 2155828 | 10/1985 | United Kingdom . | |

*Primary Examiner*—Howard N. Goldberg
*Assistant Examiner*—I. Cuda
*Attorney, Agent, or Firm*—Nixon & Vanderhye

[57] ABSTRACT

A method for the manufacture of piston rings from a metal strip, at least includes providing rings having a predetermined non-circular profile, by the metal strip being first bent to a uniform radius of curvature at least 2 percent less than the minimum radius of curvature in the predetermined profile, then the curved strip being bent back to increase the radii of curvature of all the constituent portions of the strip forming the ring to the desired values of the predetermined profile.

7 Claims, 7 Drawing Sheets

STRIP TRACKING TASK

STRIP VELOCITY SERVO

BENDING POSITION SERVO

METHOD FOR THE MANUFACTURE OF PISTON RINGS

This invention relates to a method for the manufacture of rings and, in particular, piston rings for internal combustion engines.

Such piston rings are commonly formed from metal, and have a generally circular profile but with two free ends which are adjacent one another and separated by a gap. When in use each piston ring is received in a groove provided in a piston for the internal combustion engine, where the purpose of the piston ring is to provide a seal between the piston and the interior surface of the cylinder within which the piston is to move.

The actual profile of a piston ring is not, however, perfectly circular, allowance having to be made for variation in bending moment around the circumference of the ring required to achieve an appropriate, e.g. uniform, radially outward pressure pattern when the ring is on a piston and fitted into a cylinder bore.

The manufacture of rings to which the present invention relates also includes the manufacture of rings to be incorporated in hydraulic seals, and compressors, for example. Such other types of rings also each have a predetermined non-circular form, with a gap separating two free ends. For convenience, subsequently in this specification, and the accompanying claims, reference is made only to the manufacture of piston rings for internal combustion engines. However, it is to be considered that each such reference also refers to the manufacture of any type of ring of a form capable of being provided by a method in accordance with the present invention.

Various proposals have been made for manufacturing piston rings from metal strip by bending a length of strip into a suitable shape and then severing the ring so produced.

Thus German OLS 2 838 128 discloses the shaping of wire into rings using a deflector element (e.g. a roller) which may be offered up to the wire as a function of the desired outline of a piston ring. Published UK patent Application 2 155 828A discloses a machine for producing from a metal strip piston rings of a predetermined profile for internal combustion engines, comprising at least two guides for guiding the metal strip into a generally circular profile, which is then separated from the remainder of the strip to form a piston ring, at least one of said guides being movable relatively to the other guide or guides during said formation of a piston ring to vary the profile of the strip around the piston ring, and a control system for producing digital signals corresponding to a required piston ring profile, the digital signals controlling the movement of said at least one movable guide during formation of a piston ring from said metal strip to produce a piston ring having the required profile therearound.

It is an object of the present invention to provide a novel and advantageous method of manufacturing piston rings by the shaping of metal strip, and, in particular, initially to bend the strip to a smaller radius of curvature than is really required and then to increase the radius of curvature so produced in a controlled manner.

Thus according to the present invention there is provided a method for the manufacture of piston rings for use in internal combustion engines, and from a metal strip, the method at least including providing rings having a predetermined non-circular profile, by feeding a metal strip into a guide means to align the strip and feed the strip into a first bending means, bending the strip in said first bending means into a regular curve of a predetermined radius, and feeding said curved strip into a second bending means operable to vary the radius of curvature of the strip fed thereto, the strip being bent by said first bending means to a uniform radius of at least 2 percent below the minimum radius of curvature in said predetermined ring profile, and then the strip being bent by said second bending means throughout the formation of each ring to increase the radii of curvature of all the constituent portions of the strip forming the ring to the values required in said predetermined non-circular profile.

The method of the invention facilitates the production of rings of greater consistency and accuracy than the method disclosed in UK Patent Application No 2 155 828A in which the metal strip is not bent beyond the maximum curvature required in the ring.

The uniform radius of curvature of the metal strip induced in the first bending means will generally be well above 2% less than the minimum radius of curvature needed in the predetermined ring profile. For example the ratio between these two radii of curvature may be in the range 98:100 to 2:5. Preferably the ratio of the uniform radius of curvature of the metal strip induced by the first bending means to the minimum radius of curvature needed in the predetermined ring profile is in the range 3:4 to 1:2.

In the preferred mode of operation of the present invention the metal strip to be bent is driven in a straight line between guides constituting the guide means. In the first bending means the strip is forced against an abutment having a location in relation to the position of a fulcrum pin chosen such that the strip is bent around the fulcrum pin to a greater extent than is required in the predetermined ring profile, and in the second bending means the curved metal strip from said first bending means is passed around a movable finger which, throughout the formation of each ring, urges the strip outwardly to increase the radii of curvature of all the constituent portions of the strip forming the ring by the desired amounts.

Strip is fed through said first and second bending means until at least a required ring has been produced, deflector means being used to direct the leading portion of the strip of each ring into a plane adjacent to that of the strip feeding into the bending means; and each ring produced is severed from the oncoming strip, the point of severence preferably being adjusted, so as to provide the desired gap in the ring.

Preferably the rings produced are severed one by one without arresting the feeding of the strip into the bending means.

It should also be noted that the predetermined non-circular profile of the ring produced at this point may not be the profile of the finished piston ring since in many cases the rings produced at this stage will be subjected to further treatment before use, e.g. heat treatment during nitro-carburising. We have found that such treatment may result in shape changes in the rings, and the predetermined profile to which the rings are bent in accordance with the present invention may be so that compensation is provided for any such subsequent changes in shape of the rings.

BRIEF DESCRIPTION OF THE DRAWINGS

The invention will now be described in more detail, by way of example only, with reference to the accompanying drawings of which

DETAILED DESCRIPTION OF THE DRAWINGS

Figure 1:
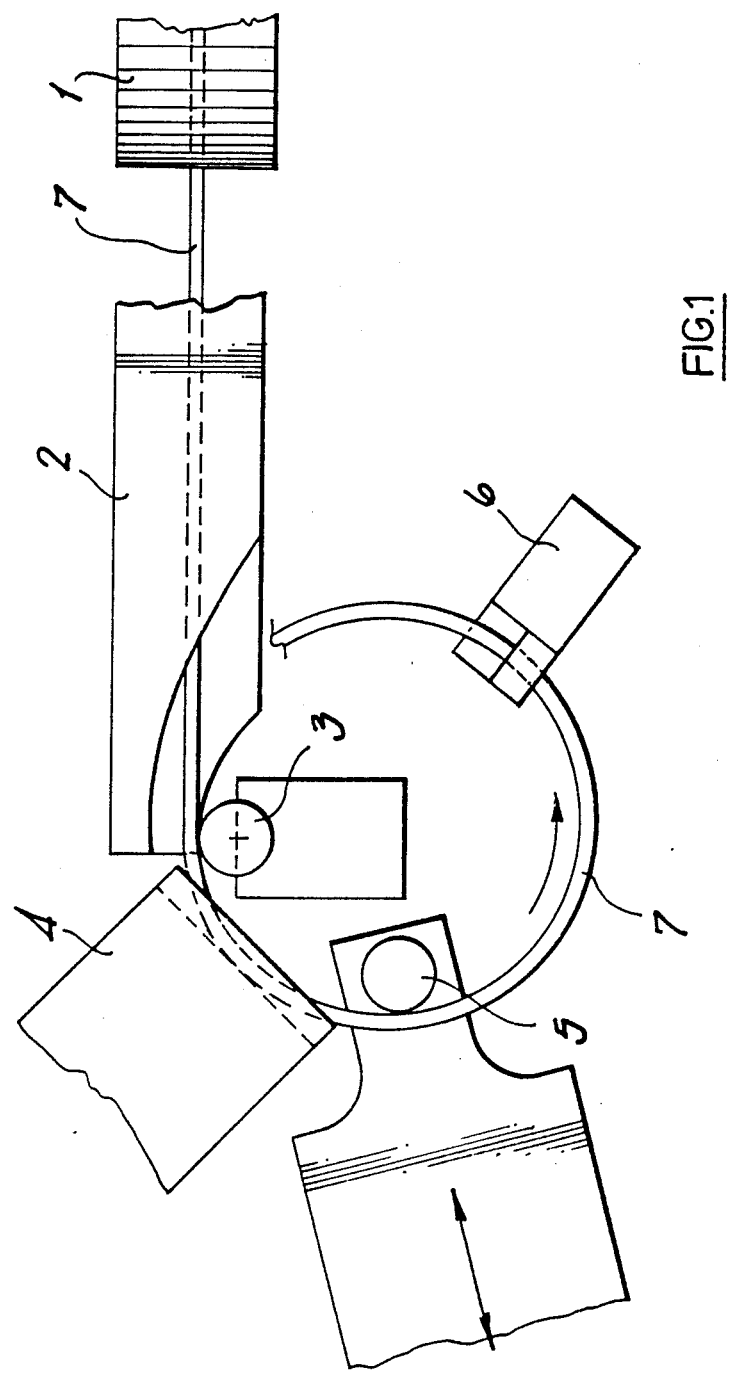
FIG. 1 is a diagram showing part of apparatus for the bending of metal strip into a ring.

As shown in FIG. 1, an apparatus for bending metal strip consists essentially of feed rollers 1 for metal strip, a guide 2 for maintaining metal strip aligned in a straight path, a first bending means composed of a fulcrum pin 3 and an abutment 4, and a second bending means composed of a movable finger 5 arranged to co-operate with the abutment 4. A high speed cropper 6 is also provided to sever the rings produced.

Figure 3:
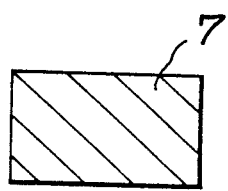
FIG. 3 is a cross-section of the metal strip before bending.

In operation a metal strip 7 of rectangular cross-section as shown in FIG. 3 is pushed by means of feed rollers 1 through the guide 2 with its wider cross-sectional dimension in the plane of the diagram shown in FIG. 1.

The metal strip passes alongside the fulcrum pin 3 and is forced against the abutment 4. It will be appreciated that the abutment 4 exerts a bending force on the metal strip 7 in the plane of its wider dimension, so that the strip is bent about the fulcrum pin 3.

As previously mentioned a non-circular profile is the predetermined target shape for the rings being produced. This is settled according to the ring shape needed for the particular use envisaged, taking into account further shape changes which may be induced by subsequent ring treatments.

The location of the abutment 4 in relation to the fulcrum pin 3 is chosen so that a desired uniform radius of curvature is induced in the metal strip between the fulcrum pin 3 and the abutment 4. This radius of curvature is at least 2% less than the minimum radius needed in the predetermined ring profile.

The metal strip 7 thence moves from the abutment 4 to a movable finger 5 exerting a radially outward pull on the strip, throughout the formation of each ring, to increase the radii of curvature of all the constituent portions of the strip forming the ring to the values required in the predetermined profile.

The position of the movable finger 5 is computer controlled, as described below, and is varied over a range to produce the predetermined non-circular profile as a length of metal strip required to form a desired ring passes around it.

Figure 5:
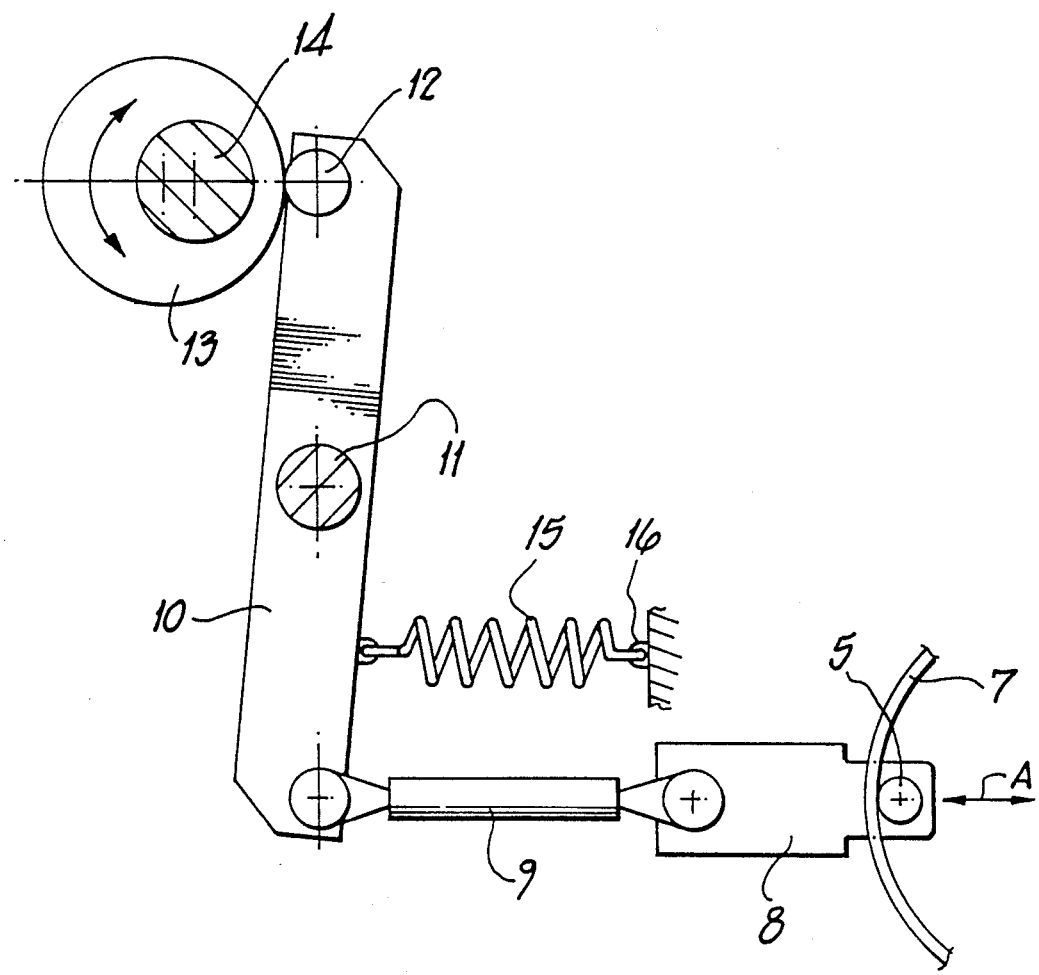
FIG. 5 is a view of constituent means of the apparatus for varying the radius of curvature of the metal strip.

One means for changing the position of the movable finger 5 is illustrated diagrammatically in FIG. 5.

As shown in FIG. 5 the movable finger 5 is mounted on a carrier 8 which is pivotally attached via an adjustable turnbuckle 9 to a lever 10. The lever 10 is pivoted about a pin 11 and the end of the lever opposite to the turnbuckle is provided with a roller 12 which bears on an eccentric 13 rotatable about a shaft 14. In operation the eccentric 13 is rotated to any angular location by a servo-motor, and a computer is used to generate signals controlling the position of the eccentric 13 by means of the servo-motor, as described below, and at any given instant during the passage of a length of metal strip corresponding to a ring over the movable finger 5.

Angular movement of the eccentric from the position shown in FIG. 5 will cause the lever 10 to pivot about the pin 11 and thereby cause linear movement of the carrier 8 which is located in a slide (not shown) permitting linear movement only along the line of arrow A in FIG. 5. The roller 12 is maintained in contact with the eccentric 13, by a tension spring 15 between the lever 10 and a fixed point 16, assisted by the reaction force between the finger 5 and the metal strip 7.

When a ring of the predetermined profile has been produced it is necessary to sever the ring from the oncoming metal strip. In the present invention the metal strip is deflected slightly after bending is complete so that the ring being produced will overlay the oncoming strip. The deflection is into a plane adjacent that of the feed of metal strip and is achieved by deflector plates (not shown in the diagrams) to produce the result illustrated diagrammatically in FIG. 2.

Figure 2:
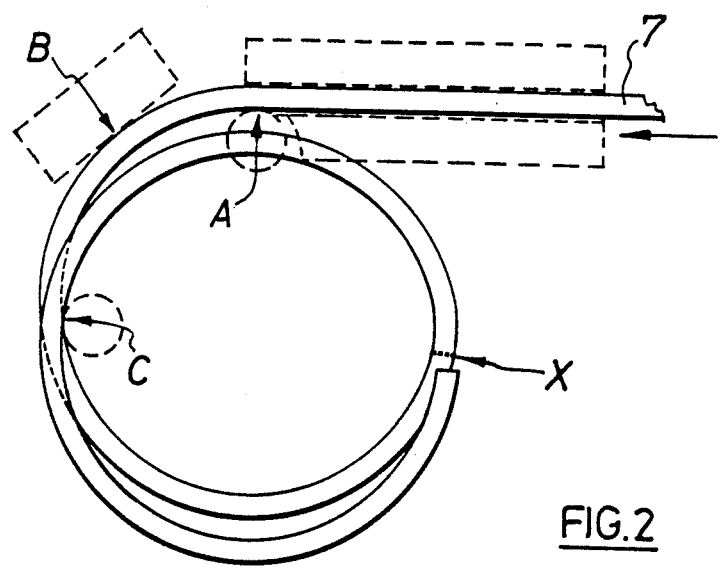
FIG. 2 is a diagram illustrating the coiled strip produced immediately prior to severing a piston ring.

FIG. 2 shows in diagrammatic form the progress of a metal strip as it is transformed from a straight strip into a ring. The strip is bent initially between points A and B to a fixed extent and then its radius of curvature is increased between B and C by varying amounts. As metal strip continues to be fed through the bending means a ring is produced which is deflected to overlay the strip being fed in. Once the complete ring has been made it must be severed, and the severing is performed in the present invention by a high speed cropper 6 (shown in FIG. 1).

Figure 4:
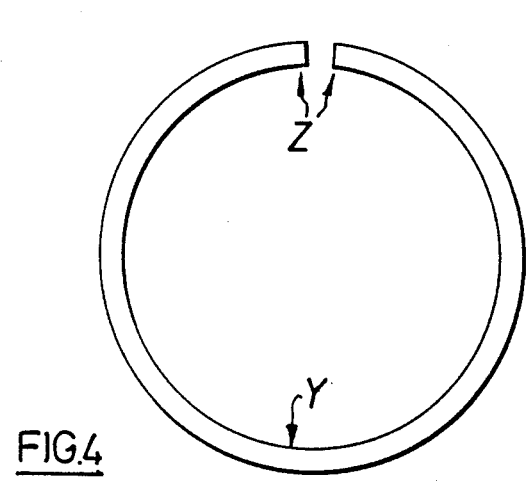
FIG. 4 is a plan view of the piston ring when severed.

The point at which the ring is severed (point X in FIG. 2) is that at which the free ends of the severed ring are at the correct position on the ring profile and have the correct separation. The usual shape of a piston ring is illustrated in FIG. 4 from which it can be seen that the ring has a minimum curvature (maximum radius) at position Y opposite the gap and maximum curvature (minimum radius) at position Z adjacent the gap.

Since during the second bending operation two simultaneous movements are taking place in that the metal strip 7 is moving forward and the movable finger 5 is moving radially inwardly and outwardly to vary the degree of bending on the strip, it is only possible to say that the strip assumes a given radius, e.g. its maximum radius, somewhere between B and C in FIG. 2. Therefore in the present invention the severance point, point X in FIG. 2 is determined experimentally for each ring profile, and each type of metal strip, since the elasticity of the metal will affect where between B and C a final radius is achieved. The determination of the severance point can be readily achieved by trial and error in each case.

It is also preferred that the severance takes place without stopping feed of the metal strip so that preferably the point of severance is located far enough away from Point C to allow a slight arrest of movement of the strip, e.g. 35 milliseconds, to be taken up by the elasticity of the strip without disturbing the bending process.

Figure 6:
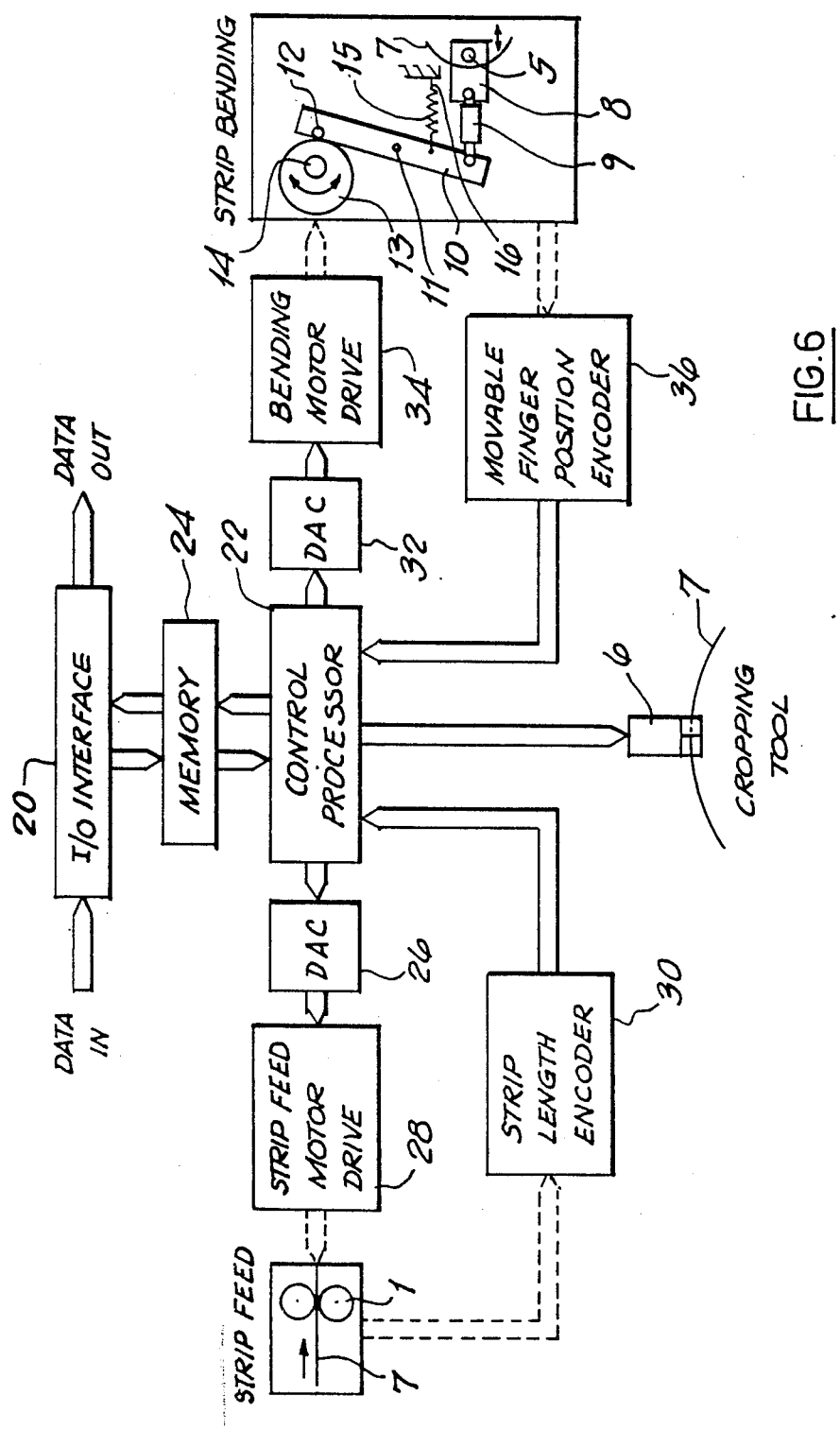
FIG. 6 is a block diagram of a control system for the apparatus.

As shown in FIG. 6, a control system for the apparatus described above comprises an input-output interface device 20 communicating with a control processor 22 via a memory 24. The control processor 22 is arranged to receive data from, and to transmit data to, the memory 24, and may comprise a type 68000 microprocessor supplied by Motorola Inc. The input-output device 20 operates in a manner compatible with the control processor 22, and, in particular is arranged to transmit data to, and receive data from, the memory 24. Further, the input-output device 20 is to receive input data In, for example, from an operator, say, via a keyboard (not shown); and is to provide output data OUT for the operator, for example, the device 20 driving a visual display unit (not shown).

The control processor 22 provides information, via a digital-to analogue converter (DAC)26, to control a servomotor 28 for feeding the metal strip 7 through the apparatus. In particular, the servo-motor 28 drives the feed rollers 1. The feed rollers 1 are coupled operably to a transducer, comprising an encoder 30, the encoder providing signals to the control processor 22, each such signal being representative of the strip length having passed through the rollers.

The control processor 22 also provides information, via a DAC 32, to control a servo motor 34 for varying the position of the movable finger 5, and so to control the radius of curvature of the strip portion instantaneously at the movable finger. In particular, the servo-motor 34 causes rotation of the eccentric 13, as described above. One convenient part of the movable finger control mechanism is coupled operably to a transducer, comprising an encoder 36, providing signals each representative of the instantaneous position of the finger. The information representative of the position of the finger 5 is supplied by the encoder 36 to the control processor 22.

Stored in the memory 24 is data defining the predetermined non-circular profile of a required ring. This profile data is obtained by employing, say, known finite element analysis techniques. There are addressable locations in the memory in this respect, at each such location the appropriate profile data for a 0.1° of arc of the ring, (or for a portion of the ring subtending an angle of 0.1° at the centre of curvature of the portion), is stored. In particular, at each such location there is stored profile data comprising the radius of curvature required for the corresponding portion of the ring, and the length of the strip 7 required in forming the part of the ring upto, and including, this ring portion.

The first location has store thereat the appropriate profile data corresponding to the leading portion of the strip 7 to form the ring.

Also stored at a CROPPING location in the memory 24, and capable of being addressed by the control processor 22, is information defining the portion of the ring being formed, comprising the appropriate 0.1° of arc of the ring, and at the movable finger 5, when the previously formed ring is to be cropped from the part of the strip 7 having passed through the bending means. As stated above, the information stored at the CROPPING location is provided as a result of experimentation when setting-up the apparatus to produce the ring, and is entered into the memory 24 via the operator's keyboard.

Also as stated above, and in relation to each ring, the encoder 30 detects the instantaneous length of the strip having passed through the feed rollers. However, the corresponding length of the strip of use in the control of the formation of the ring, and stored at each profile data location in the memory, takes into account the spacing between the two encoders 30 and 36 in the apparatus, the dimensions of relevant parts of the apparatus, and the shape of the strip as it passes between the feed rollers 1 and the movable finger 5. The control processor 22 is arranged to convert the stored strip length values to values corresponding to those detectable by the encoder 30, so that a direct comparison can be made therebetween.

This is in addition to the control processor also being arranged to covert any demanded change in the velocity of feeding of the strip, as described below, and as determined by the control processor, to a corresponding output signal, to cause the appropriate change of the drive of the servo-motor 28, and to effect the demanded change in the feeding velocity of the strip.

Similarly, the encoder 36 does not detect the instantaneous position of the movable finger 5, but a magnitude in a predetermined relationship thereto; and the position of the movable finger is in a predetermined relationship to the radius of curvature of the strip portion provided by bending the strip portion of the movable finger. The control processor 22 is arranged to convert the stored radius of curvature values to values corresponding to those detectable by the encoder 36, so that a direct comparison can be made therebetween, as described below.

This is in addition to the control processor also being arranged to convert any demanded change of the radius of curvature value, as described below, and as determined by the control processor, to a corresponding output signal, to cause the appropriate actuation of the servo-motor 34, and to effect the change in the radius of curvature.

Figure 7:
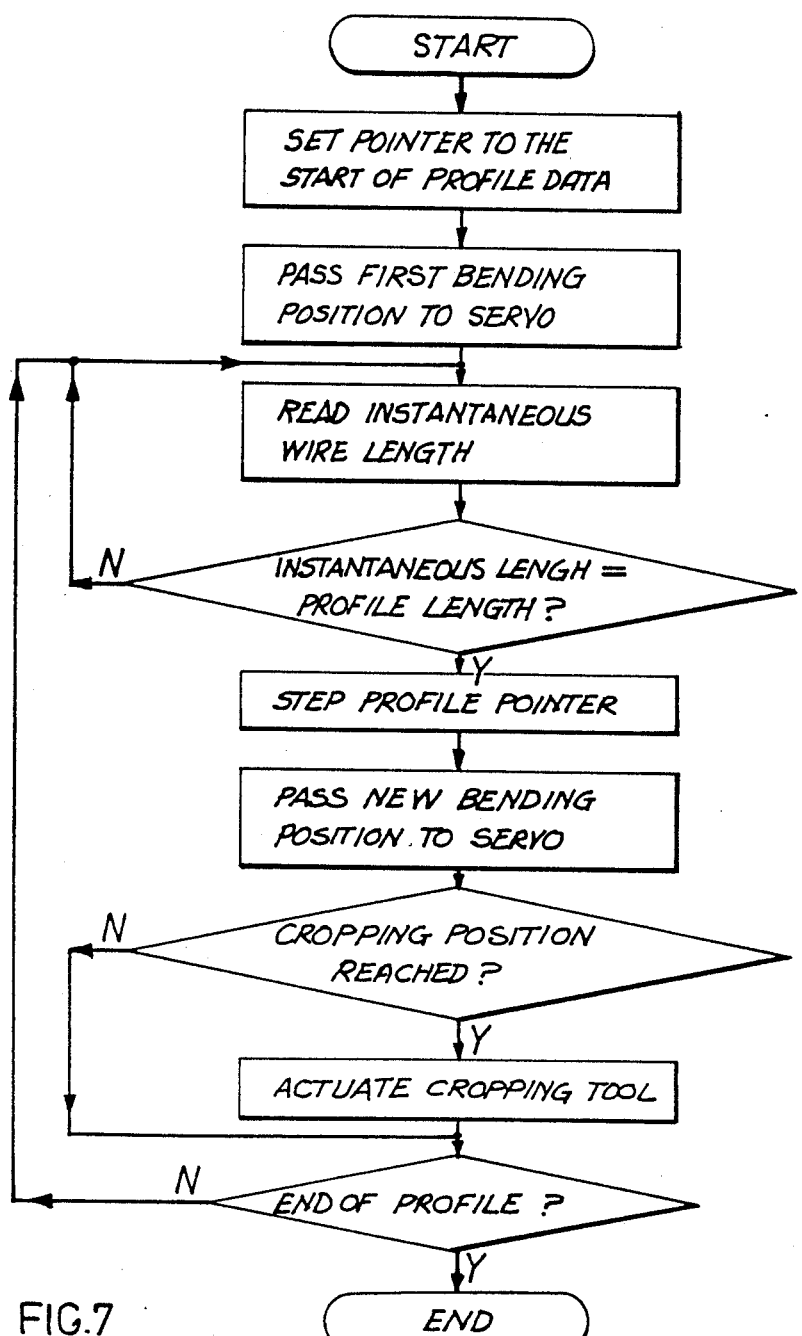
FIGS. 7 to 9 are flow charts for explaining the operation of the control system of FIG. 6.
Figure 8:
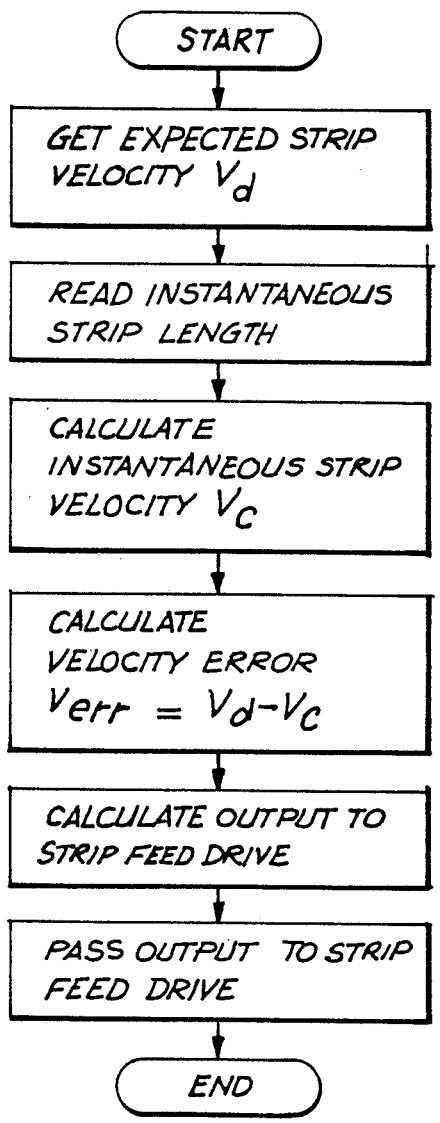
Figure 9:
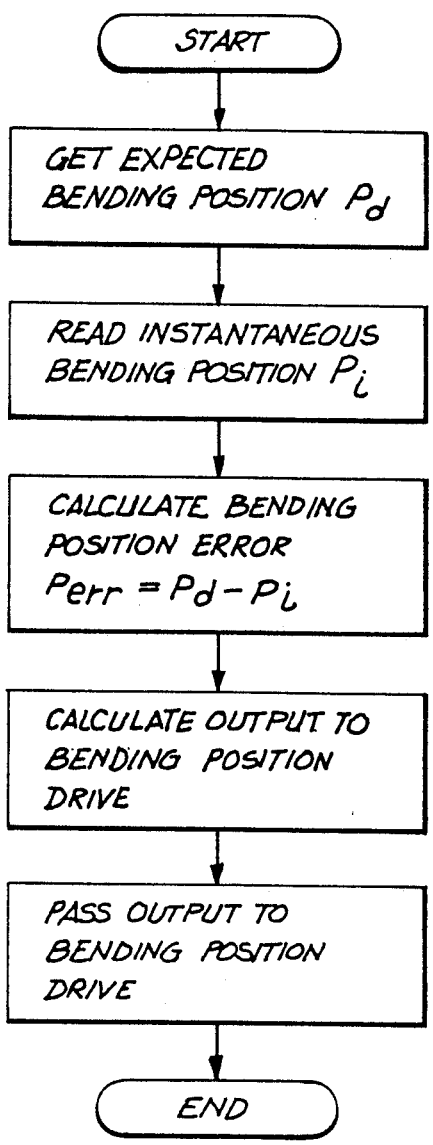

The manner of operation of the control processor 22 partially is shown in the flow charts of FIGS. 7 to 9.

At the start of the operation of the control processor in forming the ring, and as indicated in the flow chart of FIG. 7, the data at the first location of the ring profile data in the memory 24 is addressed by the control processor.

From the reading of the value of the radius of curvature of the first ring portion, and stored at the first location of the ring profile data, the control processor obtains the expected value $P_d$ of the output of the encoder 36 corresponding to the required first position of the movable finger 5.

The operation of the control processor then enters a routine which is repeated in a repetitive manner. This part of the operation of the control processor is controlled by a clock, and each constituent routine of the operation is entered after each millisecond during the formation of the required ring. In the first 250 microseconds of each routine, and as is indicated in the flow chart of FIG. 8, a strip velocity servo loop is in operation.

In the operation of the strip velocity servo loop in the first routine, and from the reading of the value of the first strip length to pass through the feed rollers 1, and stored at the first location of the ring profile data; and because the routine is clocked to last for one millisecond; the control processor obtains the currently expected velocity of the strip feed $V_d$.

Because, initially, the strip is being fed, for example, in the manner required in the formation of the final portion of the previous ring formed by the apparatus; or otherwise; the control processor obtains the instantaneous actual strip velocity $V_c$, by immediately previously having read, and stored, two outputs of the encoder 30 with a millisecond interval therebetween, and by subtracting the first such encoder output from the second output.

Any error $V_{err}$ between the currently expected velocity $V_d$ and the instantaneous actual velocity $V_c$ is determined by the control processor; and the control processor derives the corresponding change in speed of the servo-motor 28 in order to tend to eliminate $V_{err}$. The appropriate output signal is supplied by the control processor to the servo-motor 28, via the DAC 26. This completes the operation of the strip velocity servo loop in the first routine.

Then, also within the 250 microsecond period, referred to above, a bending position servo loop is in operation in the manner indicated in the flow chart of FIG. 9. As referred to above, there has been obtained the currently expected value $P_d$ of the output of the encoder 36, corresponding to the current required position of the movable finger 5.

The control processor also reads the instantaneous actual output $P_i$ of the encoder 36, possibly, comprising the position of the encoder during the formation of the final portion of the previous ring, and read, and stored, by the control processor.

Next the control processor calculates any error $P_{err}$ between $P_d$ and $P_i$; and derives the corresponding amount of actuation of the servo-motor 34 in order to tend to eliminate $P_{err}$. The appropriate output signal is supplied by the control processor to the servo-motor 34, via the DAC 32. This completes the operation of the bending position servo loop in the first routine.

After the end of the 250 microsecond period, with the required strip feed velocity, and the required position of the movable finger 5, demanded, and within the final 750 microsecond period of the first clocked routine, the control processor performs a strip tracking task, as indicated in the flow chart of FIG. 7.

The strip tracking task comprises a sub-routine to be performed repetitively until interrupted at a predetermined point in the routine, or until it is determined that the instantaneous strip length having been fed through the feed rollers 1 is equal to the strip length value stored at the first profile data location in the memory.

At the start of the sub-routine, whilst forming the first portion of the ring, the control processor 22 reads the instantaneous output of the encoder 30, and representative of the strip length as having passed through the feed rollers 1.

The control processor 22 then decides whether, or not, the thus instantaneously detected strip length as having passed through the feed rollers is equal to the value of the strip length expected to have passed through the feed rollers, and stored at the first memory located currently being addressed. This completes the sub-routine. If the decision is negative, the output of the encoder 30 is read again; and the control processor again is required to decide whether, or not, the same criterion has been obtained. The sub-routine is repeated in a repetitive manner until the decision is affirmative; or until the repetition of the sub-routine is interrupted, as referred to above.

Then, and also within the first routine, the control processor addresses the second location of profile data within the memory 24, at which location is stored profile data relating to the second 0.1° of arc of the ring. The data relating to the required radius of curvature of the second 0.1° of arc of the ring is read by the control processor.

The control processor then decides whether, or not, the information defining the portion of the ring, comprising the appropriate 0.1° of arc of the ring, and stored at the CROPPING location within the memory 24, is the same as the information defining the second portion of the ring, and stored at the second location of the profile data within the memory.

Irrespective of whether this decision is negative, or affirmative, in the final step of the routine, the control processor decides whether, or not, the second location of the profile data within the memory is the final such location of the profile data of the ring.

If this decision is also negative, the second routine is commenced, under the control of the clock, and at the end of the one millisecond period allowed for the first routine.

In the first 250 microseconds of the second routine, the strip velocity servo loop again is operated in the manner indicated in the flow chart of FIG. 8. This time the instantaneous actual strip velocity $V_c$ is determined by using the appropriate output of the encoder 30 read, and stored, in the first routine.

Then, the bending position servo loop again is operated in the manner indicated in the flow chart of FIG. 9. This time the instantaneous actual output $P_i$ of the encoder 36 is the appropriate output of the encoder 36, read, and stored, by the control processor in the first routine.

Next the sub-routine comprising the strip tracking task is performed, until the instantaneous strip length having been fed through the feed rollers is equal to the strip length value stored at the second profile data location in the memory; or until the sub-routine is interrupted, as referred to above.

The second routine is completed, including reading the profile date at the third location in the memory.

The routine is repeated, in a repetitive manner, whilst the ring is being formed with the predetermined non-circular profile in accordance with the profile data stored in the memory 24. This repetition occurs until the control processor 22 decides that the information defining a portion of the ring, and stored at the CROPPING location within the memory 24, is the same as the information defining the portion of the ring at the profile data location within the memory currently being addressed by the control processor. In response to this affirmative decision, the control processor causes the cropper 6 to be actuated. This cropping action of the previously formed ring does not interfere adversely with the formation of the ring being produced. In the same routine, inevitably, a further decision is made that the simultaneously addressed location of the profile data in the memory 24 is not the final such location.

Subsequently, the routine is continued to be repeated, in a repetitive manner; but the cropper 6 is not actuated again until after the ring being formed is completed.

The repetition of the routine of FIGS. 7 to 9 does not cease until the control processor 22 decides, in the final step of a routine, that the simultaneously addressed location of the profile data in the memory 24 is the final such location. The formation of the ring, and the operation of the control processor in forming the ring, are now complete.

Normally the control processor 22 then repeats the above operation, without interruption of the wire feed to the bending means, and in order to form a subsequent ring.

I claim:

1. A method for the manufacture of piston rings for use in internal combustion engines, from a metal strip, the method at least including providing rings having a predetermined non-circular profile, by feeding the metal strip into a guide means to align the strip and feed the strip into a first bending means, bending the strip in said first bending means into a regular curve of a predetermined radius, and feeding said curved strip into a second bending means operable to vary the radius of curvature of the strip fed thereto, the strip being bent by said first bending means to a uniform radius of at least 2 percent below the minimum radius of curvature in said predetermined ring profile, and then the strip being bent by said second bending means throughout the formation of each ring, to increase the radii of curvature of all the constituent portions of the strip forming the ring to the values required in said predetermined non-circular profile.

2. A method according to claim 1, in which the ratio of the uniform radius of curvature of the metal strip induced in the first bending means to the minimum radius of curvature needed in the predetermined ring profile is in the range 98:100 to 2:5.

3. A method according to claim 2, in which said ratio is in the range 3:4 to 1:2.

4. A method according to claim 1, in which in the first bending means the metal strip is forced against an abutment having a location in relation to the position of a fulcrum pin chosen such that the strip is bent around the fulcrum pin to a greater extent than is required in the predetermined ring profile, and in the second bending means the curved metal strip from said first bending means is passed around a movable finger which, throughout the formation of each ring, urges the strip outwardly to increase the radii of curvature of all the constituent portions of the strip forming the ring by the desired amounts.

5. A method according to claim 1, in which the leading portion of the strip of each ring is directed by deflector means into a plane adjacent to that of the strip feeding into the bending means.

6. A method according to claim 1, in which each ring produced is severed from the oncoming strip so as to provide the desired gap in the ring.

7. A method according to claim 1, in which the rings produced are severed one by one without arresting the feeding of the strip into the bending means.

* * * * *